UNITED STATES PATENT OFFICE.

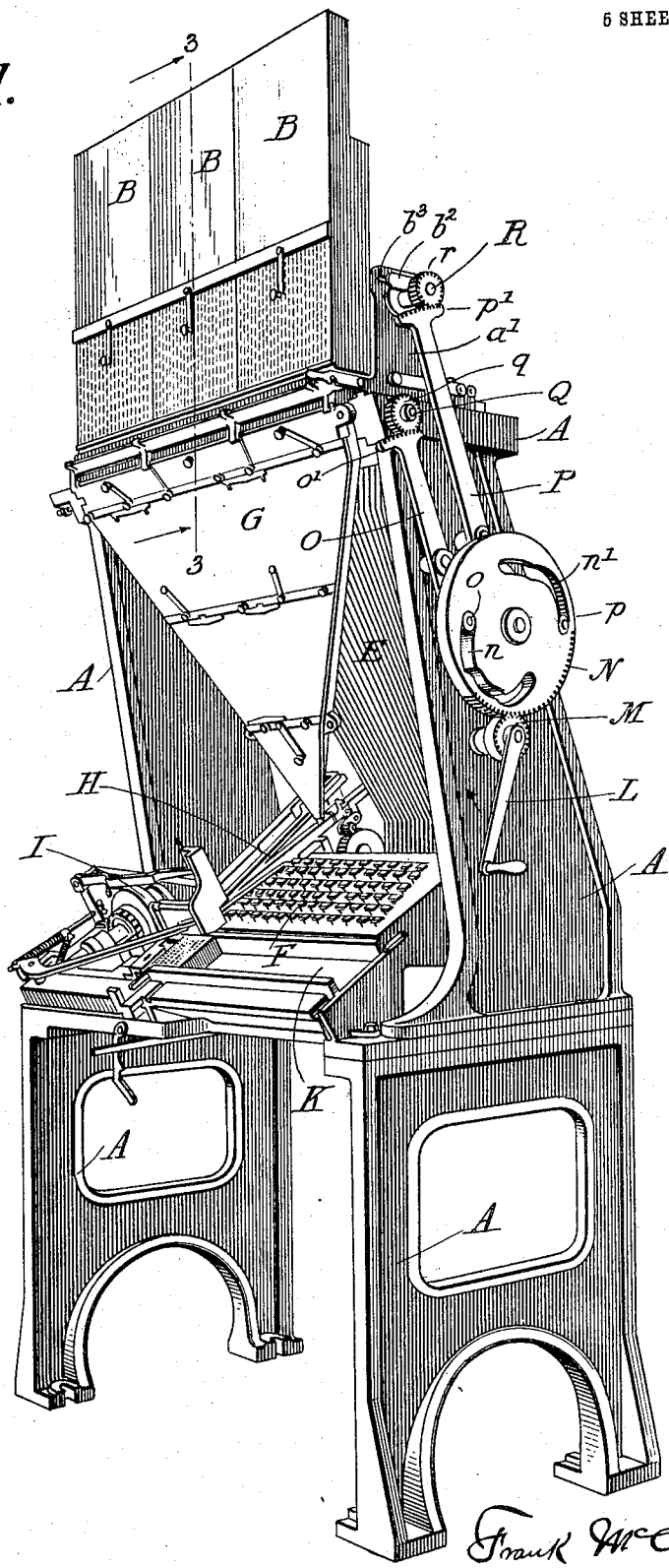

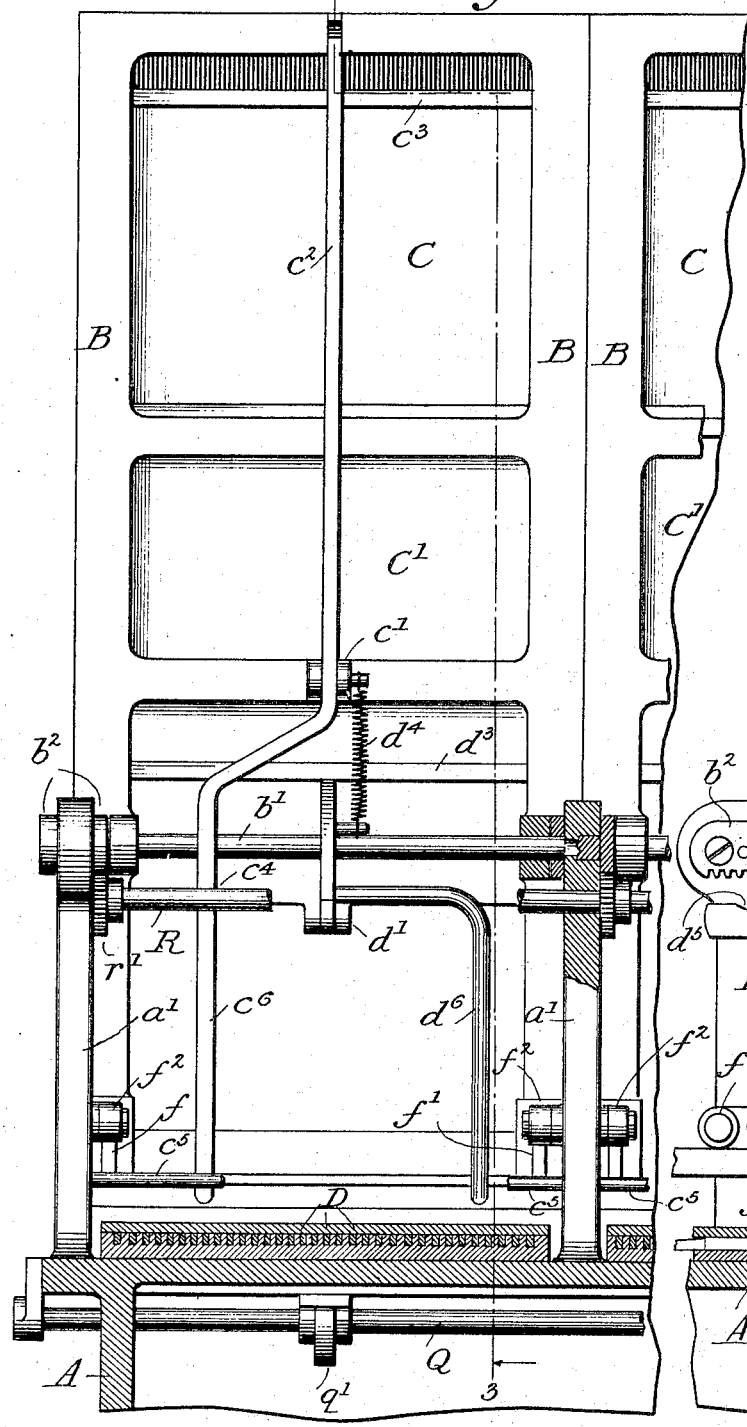
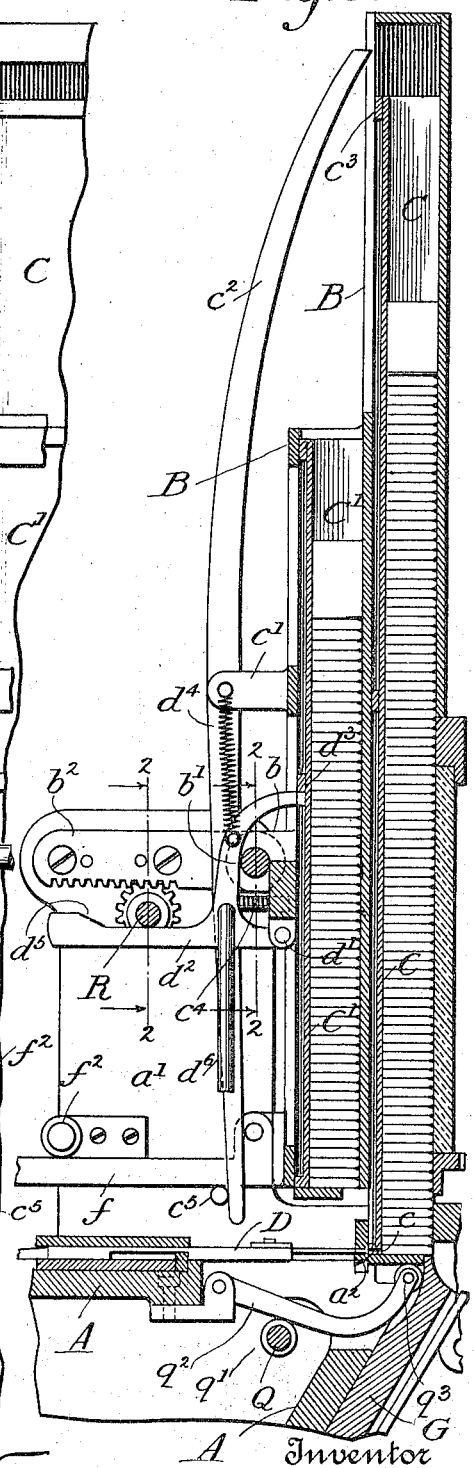

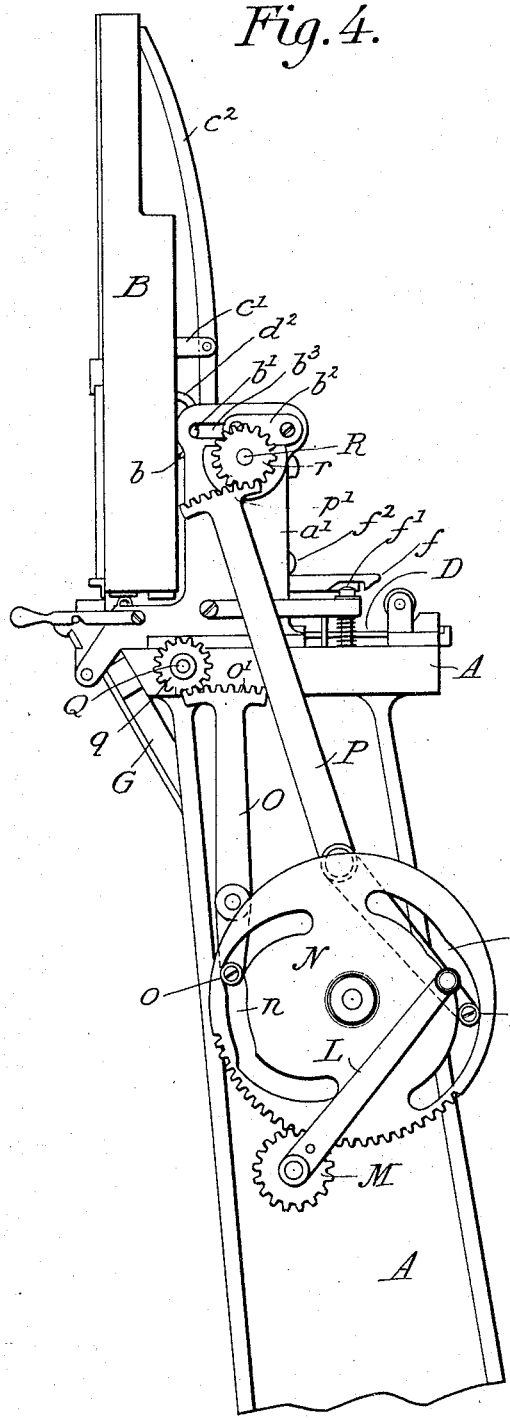
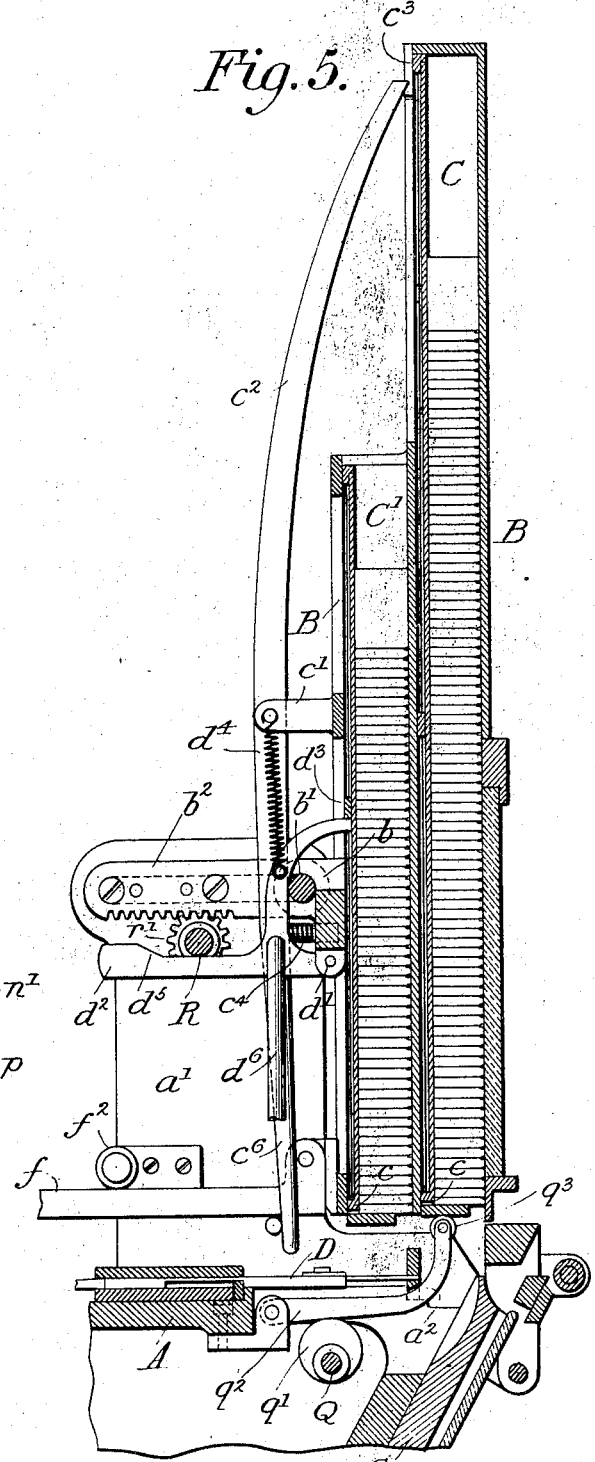

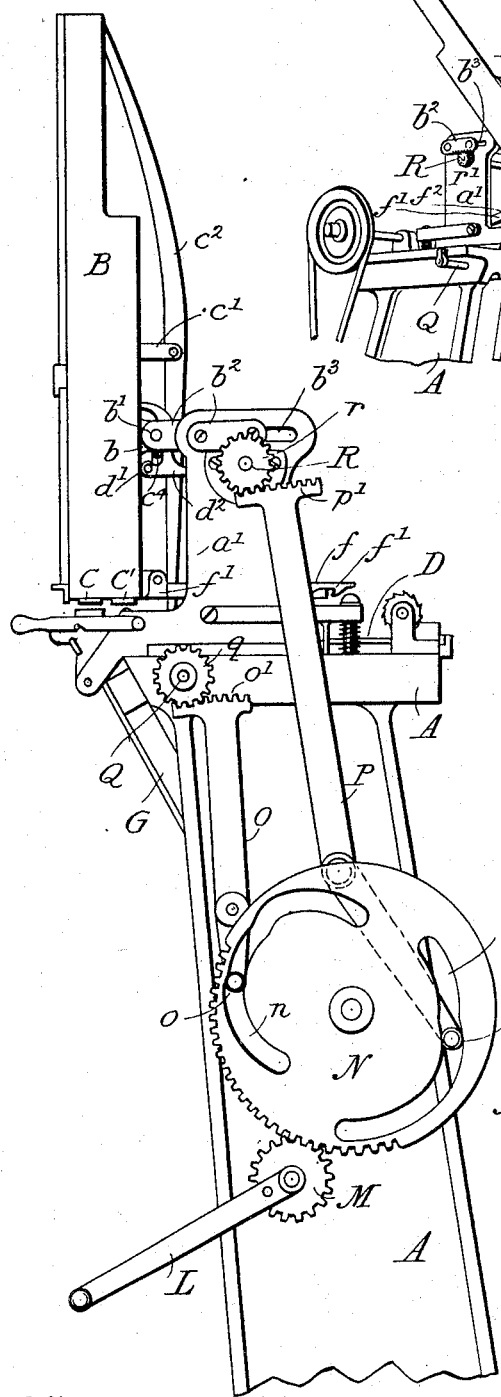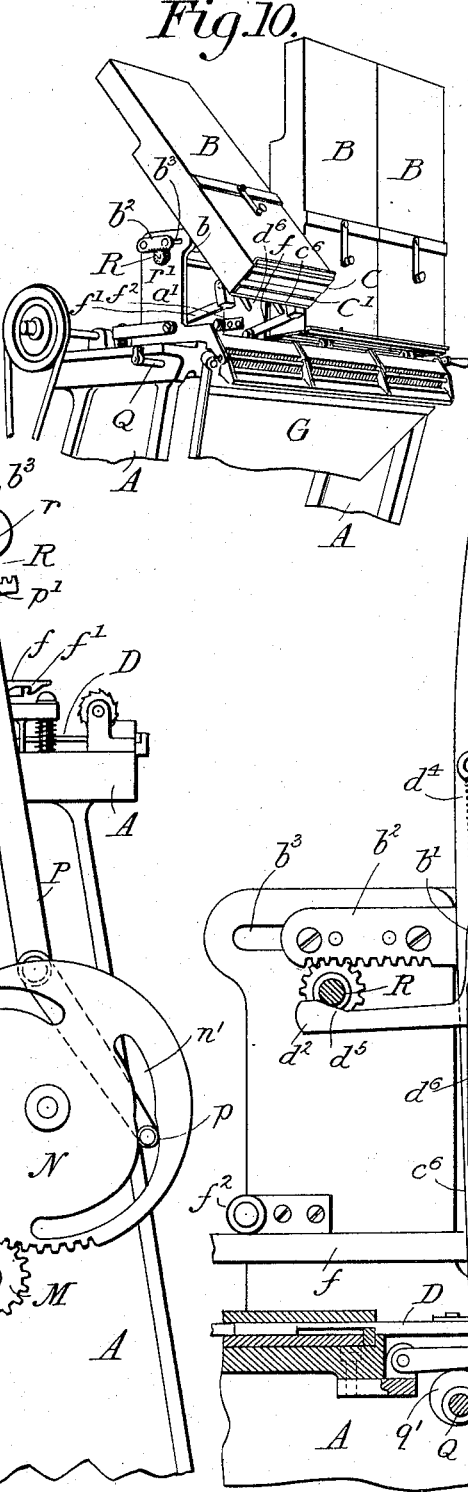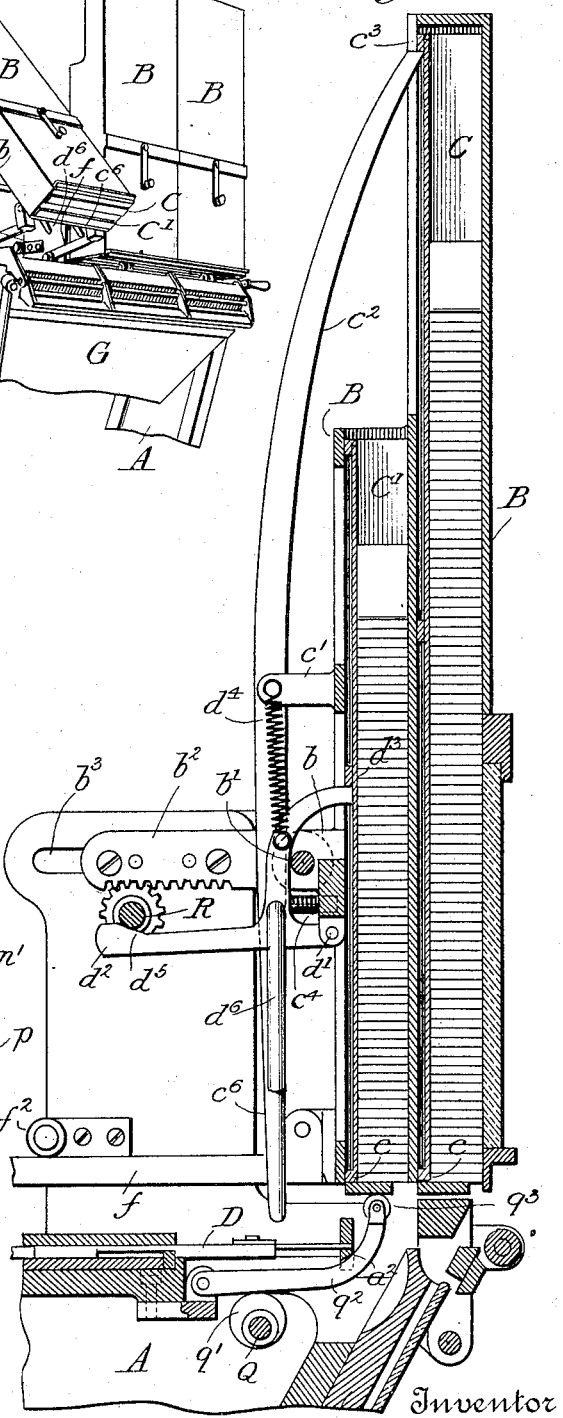

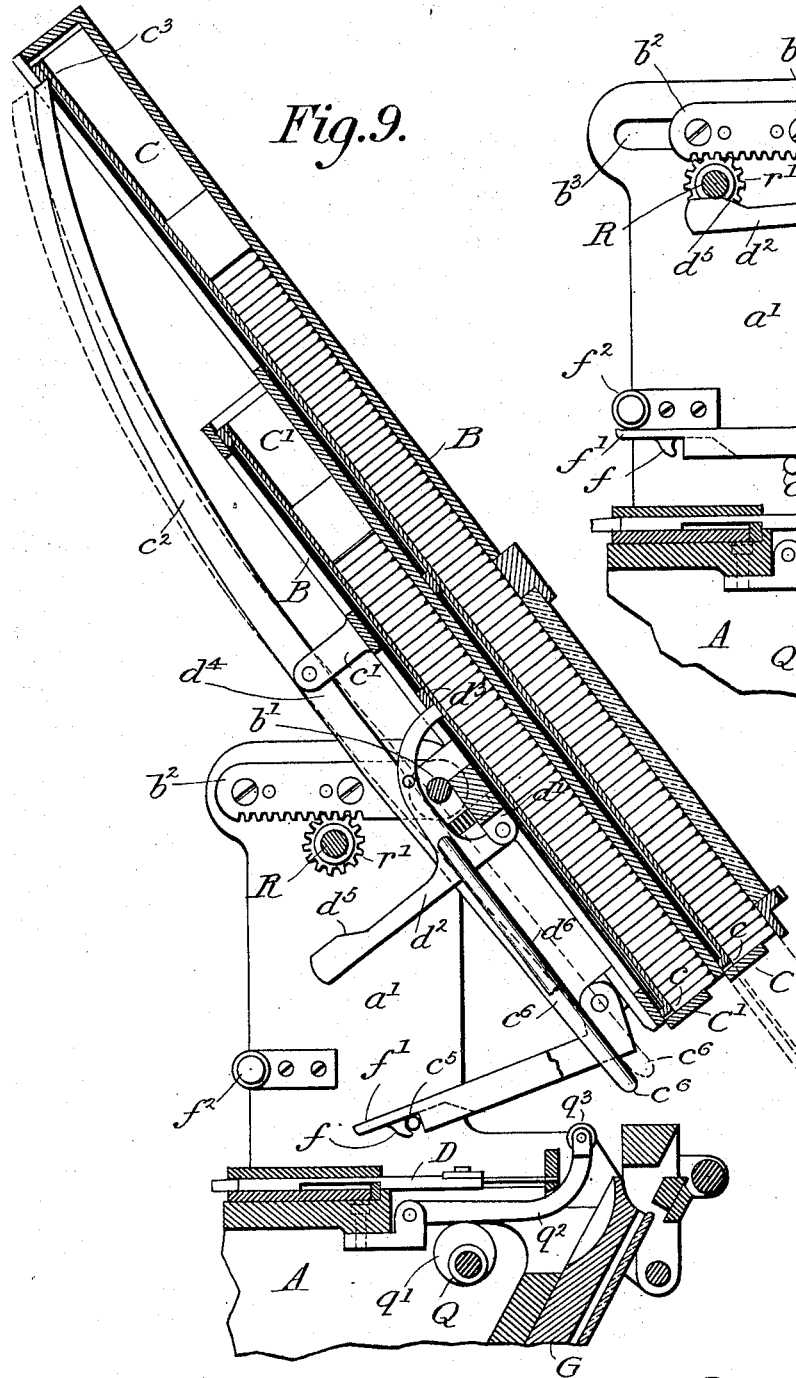

FRANK McCLINTOCK, OF GRAND JUNCTION, COLORADO, ASSIGNOR TO MERGENTHALER LINOTYPE COMPANY, A CORPORATION OF NEW YORK.

TYPE-SETTING MACHINE.

944,493.

Specification of Letters Patent. Patented Dec. 28, 1909.

Application filed September 7, 1907. Serial No. 391,840.

*To all whom it may concern:*

Be it known that I, FRANK MCCLINTOCK, of Grand Junction, county of Mesa, and State of Colorado, have invented a new and useful Improvement in Type-Setting Machines, of which the following is a specification.

My invention relates to improvements in type-setting machines, and particularly to improvements applicable to that class of machines in which cases are used containing the type in vertical channels, and from which the type is removed by means of type-plungers or ejectors, actuated through intermediate mechanism by finger-keys in such a manner that upon the depression of a key, the corresponding ejector forces forward the bottom type in the corresponding channel of the case, whereupon it falls by gravity through grooves in an inclined plate into a raceway, where the types are assembled and along which they are driven by suitable mechanism to a point where they are justified by other mechanism, to be finally ejected in justified lines upon a receiving galley.

The objects of my improvements are, first, to enable the operator to set at will two different fonts of type without leaving his seat, thus giving the machine a greater range; and second, to facilitate the removal, insertion and exchange of type cases.

The invention consists in providing two sets of cases to contain different fonts of mechanisms by means of which either of said two sets of cases is quickly thrown into operative position by the operator, and of means by which either one or all the cases are easily removed from or inserted into their holders on the machine for the purpose of substituting full cases for empty ones, or of changing fonts.

The invention will best be understood by reference to the accompanying drawings in which—

Figure 1 is a perspective view of a typesetting machine with my improvements incorporated therein, the parts being in operative position. Fig. 2 is a rear view of the upper portion of the machine, partly in section on lines 2—2 and 2ª—2² Fig. 3, showing one of the type-case holders and some of the operative mechanism, the position of the parts corresponding to that of the parts in Fig. 1. Fig. 3 is a vertical section through the case-holder, type-cases and operative mechanism on line 3—3 Figs. 1 and 2, the position of the parts corresponding to that of the same parts in Figs. 1 and 2. Fig. 4 is a side elevation of the upper portion of the machine similar to the view Fig. 1, but showing the parts in the position that they occupy after the first step has been taken to change the font. Fig. 5 is a repetition of Fig. 3, showing the parts in a position corresponding to that of the parts in Fig. 4. Figs. 6 and 7 are repetitions of Figs. 4 and 5 respectively, showing the parts in an again different position, namely, that which they occupy after the second step has been taken to change fonts. Fig. 8 is a repetition of Fig. 5, showing the parts when the change of fonts is effected, that is, after the third step has been taken for that purpose. Fig. 9 is a sectional view similar to Fig. 5, showing the case-holder tilted preparatory to the removal of the case, and also showing in dotted lines, the removal of one of the cases. Fig. 10 is a perspective view of the upper portion of the machine corresponding to Fig. 9.

Referring to the drawings, A represents a main frame. B B B are type-case holders, of which there are three in this particular machine, each hinged by ears $b$ $b$ and a horizontal rod $b'$ to slides $b^2$, capable of being moved in horizontal slots $b^3$, provided in upright brackets $a'$ of the main frame A, as particularly shown in Figs. 2, 3, 7 and 8.

C and C' are vertically channeled typecases of the form usually employed in this class of machines, and contained within the case holders B; cases C' being located directly behind cases C and containing a font of type different from that contained in cases C. Thus, for instance, cases C may carry in their channels regular roman letters, while cases C' may carry italics, or the front set of cases may carry light face and the other set bold face type, and so forth.

With the parts in the position shown in Figs. 1, 2 and 3, the front cases C are in operative position and rest with their lower rear edges on the top of the main frame A at $a^2$.

$c$, Figs. 3, 5, etc., represents the opening provided for each type channel in the rear wall of the case directly behind the lowermost type, to admit a horizontal type-plunger or ejector D, of which there are as many as there are channels. The plungers are operated as usual, through intermediate mechanism forming no part of this invention, by reeds E, Fig. 1, and finger-keys F collectively called the key-board. At the depression of a key, the corresponding ejector forces the lowermost type from its channel in the case, after which the type descends by gravity through a channel in the inclined plate G to the raceway H, where it is carried forward by suitable mechanism to join the line of type that preceded it. This line of type is, at measured intervals, carried farther down the raceway to the justifying mechanism I, and thence to the receiving galley K.

When it is desired to change the font in use from that contained in cases C to that contained in cases C', the former are first lifted within the case-holder from their position shown in Fig. 3, to that shown in Fig. 5, and locked in this position relatively to the case-holder. Next, the case-holder containing both cases C and C', is moved forward, as shown in Fig. 7; next, cases C', which thus far have been locked in an elevated position relatively to the case-holders, are unlocked and finally lowered upon the edge $a^2$ of the main frame, to occupy the same position that case C previously occupied, as shown in Fig. 8.

The various motions outlined above, of the type-cases and case-holders are effected by the operator through the turning of a crank L, Figs. 1, 4 and 5, mounted upon a stud on the main frame within easy reach of the operator seated in front of the keyboard. Integral with the crank L is a pinion M meshing with gear teeth cut into part of the circumference of a cam-disk N, also mounted on a stud on the main frame. The cam-disk N has two slots $n$ and $n'$, constituting cam surfaces for rollers $o$ and $p$ to roll upon, said rollers being attached to ends of levers O and P fulcrumed on studs on the main frame. The other free ends of levers O, P, are shaped into racks $o'$ and $p'$, that mesh with pinions $q$ and $r$ fastened to horizontal shafts Q and R, journaled on the main frame. As shown particularly in Figs. 2, 3, 5, 7 8 and 9, shaft Q carries three eccentric cams $q'$ which, upon turning shaft Q, raise and lower respectively the free ends of three levers $q^2$ fulcrumed in the main frame. The free ends of these levers terminate in rollers $q^3$, and are located directly underneath the middle of the three case-holders B, and consequently underneath the type-case C or C', according to which is in operative position at the time. Thus in Fig. 3, cases C are directly over the rollers $q^3$. The other horizontal shaft R carries pinions $r'$ $r'$ that mesh with racks cut on the under side of slides $b^2$, as shown in Figs. 2, 3, 5, 7, 8, 9 and 10, so that a turning motion of shaft R will cause a horizontal motion of slides $b^2$ and consequently of case-holders B hinged thereto, as previously stated.

The slot $n$ of cam-disk N is of such a shape in three sections that it will, upon being moved from one extreme end to the other over the roller $o$ contained in it, cause lever O to first rock in one direction, secondly, to have a period of rest, and thirdly and finally, to rock in the opposite direction. To the three sections of slot $n$ correspond three sections of slot $n'$, which, being moved over roller $p$ therein contained, causes lever P to first have a period of rest, secondly, to rock in one direction, and thirdly, to again have a period of rest. It will be understood that upon turning the crank L in one direction, for instance, in the direction indicated by the arrow in Fig. 1, lever O will swing to the right, as shown in Fig. 4, causing shaft Q to revolve, and its eccentrics $q'$ to act on levers $q^2$, which in turn will raise type-cases C on rollers $q^3$ within the case-holders, as shown clearly in Fig. 5. During this motion of shaft Q, lever P has been at rest. During the period of rest of shaft Q, follows a rocking motion of shaft R, imparted to it by the lever P, whose roller $p$ is traversed by the second section of cam slot $n'$, in consequence of which pinions $r'$ $r'$ act upon the racks of slides $b^2$ causing them, together with the type-case attached to them, to move forward, so that type-cases C leave the rollers $q^3$ and type-cases C' take their places, all as shown in Figs. 6 and 7. The remaining sections of slots $n$ and $n'$ will now respectively rock lever O in opposite direction, and leave lever P at rest, causing the type-cases C' to descend and come to rest upon edge $a^2$ through the reverse action of shaft Q, eccentrics $q'$, and levers $q^2$, as shown in Fig. 8. Turning the crank L in the other direction reverses all the motions, so that the parts will successively assume the positions shown in Figs. 8, 7, 5 and 4.

After the first step in changing from one set of type-cases to the other, that is, after the type-cases to be thrown out of action have been raised, they must be locked in this raised position within the case-holders, so that the lateral motion of the latter, which constitutes the second step, may safely be taken, and after completion of this step, the set of cases to be put into action must be unlocked from their elevated position preparatory to being lowered into operative position. These locking and unlocking actions are effected by suitable mechanisms, one for each type-case, as follows: Referring to Figs. 2 and 3, $c'$ is a bracket integral with the rear frame of the case holder B. $c^2$ is a lever pivoted to said bracket. The upper end of lever $c^2$ has a tendency to move inward and under a ledge $c^3$ integral with and located at the rear upper edge of the type-case C, when the latter is raised, as shown in Fig. 7. This tendency to swing inward is given to lever $c^2$ by a compression spring $c^4$ located between the case-holder and the lower arm of the lever. When the parts are in the position shown in Figs. 2 and 3, that is, when the front set of type-cases is in operation, the upper end of the lever $c^2$ is held away from the ledge $c^3$ by a pin $c^5$ set into the upright bracket $a'$ of the main frame, which presses the lever $c^2$ against its spring $c^4$.

In changing fonts, the first operation is, as has been described, to raise the type-case C. The shape of the cam slot $n$ is such that the case will be raised to a somewhat higher position, shown in Fig. 5, than its normal elevated position, and lowered to the latter position just after the second part of the operation, the lateral movement of the case-holder B, has begun. As soon as this movement occurs, however, the lower arm of lever $c^2$ leaves the pin $c^5$, and under the action of spring $c^4$, its upper end enters under the ledge $c^3$ of the case C, which is thus locked in its elevated position, as shown in Fig. 7. A similar locking device is provided for the rear type-case C'. Pivoted to the bracket $d'$ in the rear of the case-holder is a bell-crank lever $d^2$, one arm of which enters under a ledge $d^3$ located at about the middle of the rear wall of the type-case C'. The lever has a tendency to enter and remain under said ledge $d^3$, holding case C' in an elevated position by virtue of an extension spring $d^4$. The other arm of lever $d^2$ extends rearward and outward under the horizontal shaft R, and is so shaped at its end with a cam surface $d^5$, that when the case-holder moves sufficiently outward, this cam surface will ride on shaft R, causing the other lever arm to be withdrawn from under the ledge $d^3$ against the action of the spring $d^4$ whereby the case C' is free to descend, as shown in Fig. 7. To facilitate the withdrawal of the lever $d'$ from under the ledge $d^3$, the cam slot $n$ is so shaped that the case C' is lifted still farther before it is allowed to descend.

During all the operations thus far described, the case-holder B and the type-cases C and C' contained therein, are held perpendicular relatively to the main frame in the following manner: To the bottom and at the rear of the type-cases are hinged L-shaped levers $f$ and $f'$, one pair for each holder, in such manner that they rest with their heels against the rear wall of the holder, and extend their arms rearward at right angles. These extending arms of levers $f$, $f'$, pass under rollers $f^2$, attached to brackets $a'$ of the main frame. They are unable, by virtue of their heels resting against the case-holders, to swing down and thus form a means of preventing the case-holders from swinging with their lower ends beyond the perpendicular, as their tendency is to do, their centers of gravity being in front of their pivotal points, there is, of course, for the same reason, no tendency to swing in the other direction by gravity. The case-holders may, however, be swung in this other direction by being pushed backward at the top, and thus may be given, each or all of them, an inclined position, as shown in Figs. 9 and 10, for the purpose of removing the cases or inserting them. When a case-holder is so swung out of plumb, it is automatically locked in that position in the following manner. The L-shaped levers $f$ and $f'$ ride on pins $e^5$ when the holders are swung out. One of the levers has, at the free end, a hook engaging its pin $e^5$ so as to prevent further movement of the holder outward, while the other lever $f'$ has an off-set falling behind its pin $e^5$, thus locking the holder from falling back. Before the case-holder is swung outward, the crank L is turned so far as to have both sets of cases C and C' in raised position within the holders, and consequently locked therein by virtue of the levers $c^2$ and $d^2$ engaging respectively the ledges $c^3$ and $d^3$, as previously explained.

To remove a type-case from the holder when in the inclined position shown in Figs. 9 and 10, the operator places one of his hands at the bottom opening of the holder, and with the other hand releases the locking lever $c^2$ or $d^2$, as the case may be, freeing thereby the particular type-case that he wishes to remove, and the same slides out of the holder into his hand ready to receive it, as indicated in dotted lines in Fig. 9.

To facilitate the release of levers $c^2$ and $d^2$, the same are provided with handles $c^6$ and $d^6$ respectively, so placed that they can be conveniently reached with the fingers when the case-holder is swung outward.

To replace the case-holder into its normal vertical position, it is necessary only to reach underneath and behind it and to lift the L-shaped lever $f'$ so its off-set clears the pin $e^5$, upon which the case-holder swings back into position by gravity, locking itself by the L-shaped levers passing under rollers $f^2$. After the case-holder is thus swung back into position, the particular case C or C' wanted, is lowered by turning the crank L, and the machine is again ready to be operated.

The operations described above are very quickly performed, and at no time are the type-cases in any danger of being dropped or their contents in danger of being spilled.

Having described my invention, what I claim is:

1. In a type-setting machine, the combination of means for discharging the type, an upright type case thereover, a tiltable support for the case, and means for automatically locking the case in the support when the latter is tilted, whereby accidental escape of the case is prevented.

2. In a type-setting machine, and in combination with horizontal type-ejectors, an upright type case thereover, an upright horizontally pivoted support for the case, means for lifting the case within the support above the operative position and means controlled by the tilting movement of the support for locking and unlocking the case.

3. In a type-setting machine, the combination of type-ejectors, an upright type case thereover, a movable support for the type case, and means acting beneath the type case to lift the same within the support.

4. In a type-setting machine, the combination of a type-delivering mechanism, two parallel type cases above the same, a support for said cases, a horizontal axis for said support, means for moving said axis horizontally to bring one case or the other over a type-delivering mechanism, and means for raising and lowering the cases one at a time in said support.

5. In a typesetting machine, the combination of type delivering devices, two parallel upright type cases, and means for moving said cases horizontally in unison, and for raising and lowering each case independently of the other.

6. In a type-setting machine, and in combination with means for delivering type therefrom, two upright parallel cases, means for moving the cases jointly in a horizontal direction, means for lifting the cases individually in a vertical direction, and means for automatically locking the respective cases in their elevated position.

7. In a type-setting machine, horizontal type-ejectors D in combination with two parallel upright type cases, a support B, open at the lower end to receive and deliver said cases, a horizontal axis on which said support is mounted, means for moving said axis in a horizontal direction, and means for lifting and sustaining the cases one at a time.

8. In a type-setting machine, the combination of an upright type case, a support B therefor, a horizontal axis $b'$ for said support, and a horizontally movable support $b^2$ carrying said axis.

9. In a type-setting machine, the combination of type-ejecting devices, two parallel type cases above the same, means for moving the type cases in a horizontal direction, and means for raising and lowering the cases one at a time.

10. In a type-setting machine, the combination of type-ejecting mechanism, two parallel type cases above the same, a support or holder for said cases a horizontally movable support to which said case-holder is jointed, means for moving said support horizontally, means for lifting the cases, and an actuating mechanism common to the last two named devices.

11. In a type-setting machine, in combination with type-ejecting devices, an upright type case movable horizontally and vertically, a lifting arm acting beneath the case, and an eccentric acting to lift the arm, substantially as shown.

In testimony whereof I hereunto set my hand this seventh day of August, 1907, in the presence of two attesting witnesses.

FRANK McCLINTOCK

Witnesses:
H. L. McCLINTOCK,
CHAS. E. CHERRINGTON.